(12) United States Patent
Sloane et al.

(10) Patent No.: US 12,335,401 B2
(45) Date of Patent: *Jun. 17, 2025

(54) SYSTEM AND METHOD FOR ESTABLISHING PERMANENT RECORDS BASED ON MICROINTERACTIONS (71) Applicant: BANK OF AMERICA CORPORATION, Charlotte, NC (US)

(72) Inventors: Brandon Sloane, Indian Land, SC (US); Vijaya L. Vemireddy, Plano, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/381,114

(22) Filed: Oct. 17, 2023

(65) Prior Publication Data
US 2024/0048392 A1 Feb. 8, 2024

Related U.S. Application Data (63) Continuation of application No. 17/383,829, filed on Jul. 23, 2021, now Pat. No. 11,818,270.

(51) Int. Cl.
H04L 9/32 (2006.01)
H04W 4/80 (2018.01)
H04L 9/00 (2022.01)

(52) U.S. Cl.
CPC .......... H04L 9/3236 (2013.01); H04L 9/3273 (2013.01); H04W 4/80 (2018.02); H04L 9/50 (2022.05)

(58) Field of Classification Search
None
See application file for complete search history.

(56) References Cited

U.S. PATENT DOCUMENTS 10,621,327 B2  4/2020  Kurian
2019/0108327 A1* 4/2019  Kurian .................... G06F 21/44

* cited by examiner

Primary Examiner — Brandon Hoffman
(74) Attorney, Agent, or Firm — Moore & Van Allen PLLC; Anoohya Yarlagadda (57) ABSTRACT Embodiments of the present invention provide a system for establishing permanent records based on micro-interactions. In particular, the system may be configured to identify initiation of an event based on receiving first set of interaction requests from user devices of one or more users, initiate a first set of micro-interactions, wherein initiation of the first set of micro-interactions comprises transferring resources to one or more resource pools associated with the one or more users, identify completion of the event based on receiving a second set of interaction requests from the user devices of the one or more users, revert the first set of micro-interactions, wherein reverting the first set of micro-interactions comprises transferring the resources back from the one or more resource pools associated with the one or more users, and create a permanent record associated with the initiation of the event and the completion of the event.

20 Claims, 5 Drawing Sheets

SYSTEM AND METHOD FOR ESTABLISHING PERMANENT RECORDS BASED ON MICROINTERACTIONS

CROSS-REFERENCE TO RELATED APPLICATION

This application is a continuation application of and claims priority to U.S. Pat. No. 11,818,270, filed on Jul. 23, 2021, issued on Nov. 14, 2023, and of the same title; the contents of which are also incorporated herein by reference.

BACKGROUND

Typically, conventional systems do not have the ability to verify users of a future interaction and also establish records associated with interactions between the users. As such, there exists a need for a system to establish permanent records based on micro-interactions.

BRIEF SUMMARY

The following presents a summary of certain embodiments of the invention. This summary is not intended to identify key or critical elements of all embodiments nor delineate the scope of any or all embodiments. Its sole purpose is to present certain concepts and elements of one or more embodiments in a summary form as a prelude to the more detailed description that follows.

Embodiments of the present invention address the above needs and/or achieve other advantages by providing apparatuses (e.g., a system, computer program product and/or other devices) and methods for establishing permanent records based on micro-interactions. The system embodiments may comprise one or more memory devices having computer readable program code stored thereon, a communication device, and one or more processing devices operatively coupled to the one or more memory devices, wherein the one or more processing devices are configured to execute the computer readable program code to carry out the invention. In computer program product embodiments of the invention, the computer program product comprises at least one non-transitory computer readable medium comprising computer readable instructions for carrying out the invention. Computer implemented method embodiments of the invention may comprise providing a computing system comprising a computer processing device and a non-transitory computer readable medium, where the computer readable medium comprises configured computer program instruction code, such that when said instruction code is operated by said computer processing device, said computer processing device performs certain operations to carry out the invention.

In some embodiments, the present invention identifies initiation of an event based on receiving first set of interaction requests from one or more user devices of one or more users, in response to receiving the first set interaction requests, initiates a first set of micro-interactions, wherein initiation of the first set of micro-interactions comprises transferring resources to one or more resource pools associated with the one or more users, identifies completion of the event based on receiving a second set of interaction requests from the one or more user devices of the one or more users, in response to receiving the second set of interaction requests, reverts the first set of micro-interactions, wherein reverting the first set of micro-interactions comprises transferring the resources back from the one or more resource pools associated with the one or more users, and creates a permanent record associated with the initiation of the event and the completion of the event.

In some embodiments, the present invention receives the first set of interaction requests and the second set of interaction requests from the one or more users, via an entity device comprising a Near Field Communication interface, wherein the first set of interaction requests and the second set of interaction requests are Near Field Communication interaction requests.

In some embodiments, the present invention determines a first set of time-stamps associated with the first set of the interaction requests and inserts the first set of time-stamps in the permanent record, wherein the first set of time-stamps are associated with initiation of the event.

In some embodiments, the present invention determines a second set of time-stamps associated with the second set of the interaction requests and inserts the second set of time-stamps in the permanent record, wherein the second set of time-stamps are associated with completion of the event.

In some embodiments, the present invention identifies completion of the event based on receiving a last interaction request of the second set of interaction request, identifies a last time-stamp associated with the last interaction request, and inserts the last time-stamp as event completion time-stamp in the permanent record.

In some embodiments, the present invention stores the permanent record on a distributed ledger.

In some embodiments, the present invention transfers the resources and revert the resources, via an entity application provided by an entity.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, the term "resource entity" or "entity" may be any institution which involves in financial transactions. In one embodiment, the term "entity" or "resource entity" may be any financial institution. As used herein, the term "entity device" may be any device associated with the entity. In some embodiments of the present invention, the entity device may be any device with a Near Field Communication (NFC) interface.

As described herein, a "user" may be a customer or a potential customer of the entity. In some embodiments, a "user" may be a financial institution customer (e.g., an account holder or a person who has an account (e.g., banking account, credit account, or the like)). An "account" or "resource pool" may be the relationship that the customer has with the financial institution. Examples of accounts include a deposit account, such as a transactional account (e.g. a banking account), a savings account, an investment account, a money market account, a time deposit, a demand deposit, a pre-paid account, a credit account, a non-monetary customer information that includes only personal information associated with the customer, or the like. The account is associated with and/or maintained by a financial institution.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

Conventional systems do not have the capability to create records associated with in-person events and capture additional details associated with in-person events. As such, there exists a need for a system that creates records associated with in-person events, where the records comprise all details associated with the in-person events. The system of the present invention establishes a permanent record associated with the in-person events based on performing micro-interactions.

Figure 1:
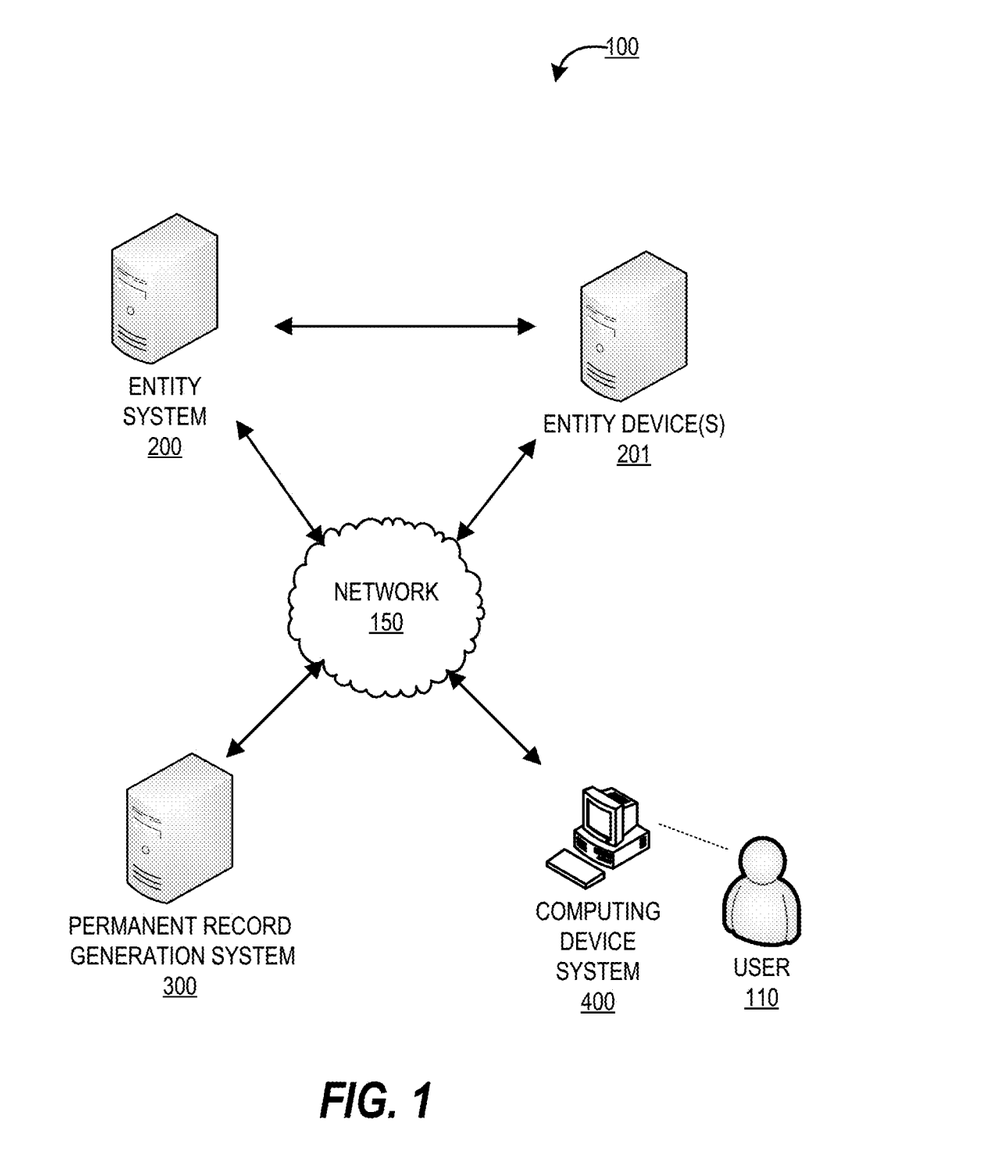
FIG. 1 provides a block diagram illustrating a system environment for establishing permanent records based on micro-interactions, in accordance with an embodiment of the invention.

FIG. 1 provides a block diagram illustrating a system environment 100 for establishing permanent records based on micro-interactions, in accordance with an embodiment of the invention. As illustrated in FIG. 1, the environment 100 includes an electronic resource request processing system 300, entity system 200, one or more entity devices 201, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be customers of an entity associated with the entity system 200.

The entity system(s) 200 may be any system owned or otherwise controlled by an entity to support or perform one or more process steps described herein. In some embodiments, the entity is a financial institution. In some embodiments, the one or more entity devices 201 may be owned, operated, controlled, and/or maintained by the entity. The one or more entity devices 201 may be any devices that comprise NFC interface.

The electronic resource request processing system 300 is a system of the present invention for performing one or more process steps described herein. In some embodiments, the electronic resource request processing system 300 may be an independent system. In some embodiments, the electronic resource request processing system 300 may be a part of the entity system 200.

The electronic resource request processing system 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the electronic resource request processing system 300 is configured to communicate information or instructions with the entity system 200, and/or the computing device system 400 across the network 150.

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the electronic resource request processing system 300, and/or entity system 200 across the network 150.

Figure 2:
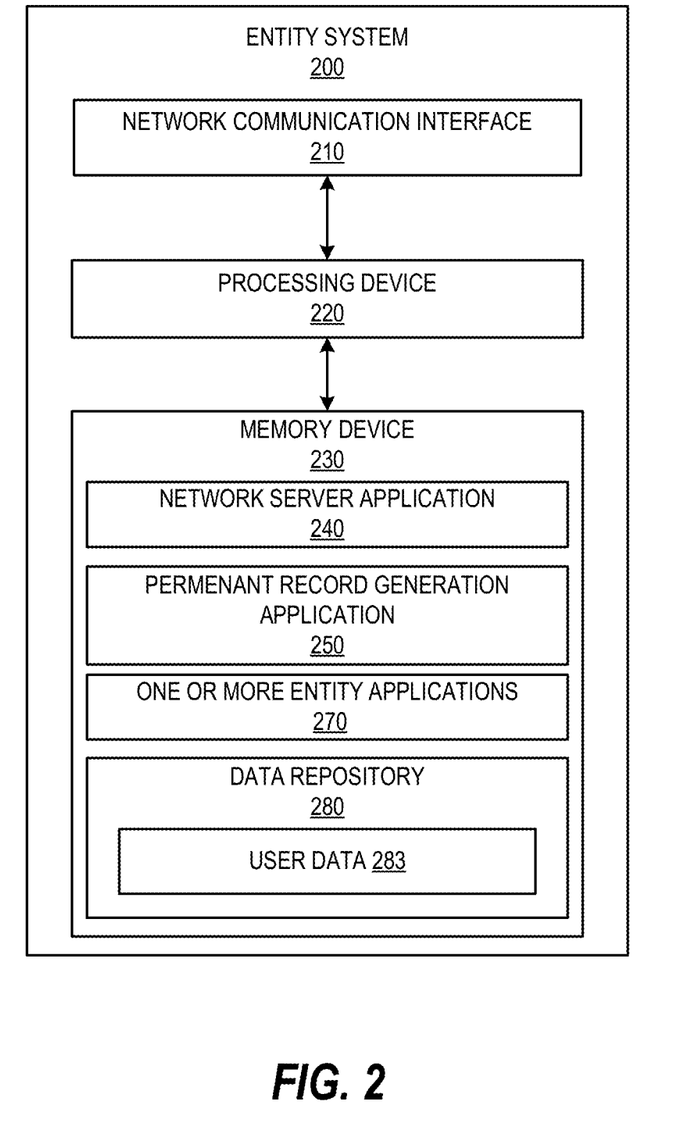
FIG. 2 provides a block diagram illustrating the entity system 200 of FIG. 1, in accordance with an embodiment of the invention.

FIG. 2 provides a block diagram illustrating the entity system 200, in greater detail, in accordance with embodiments of the invention. As illustrated in FIG. 2, in one embodiment of the invention, the entity system 200 includes one or more processing devices 220 operatively coupled to a network communication interface 210 and a memory device 230. In certain embodiments, the entity system 200 is operated by a first entity, such as a financial institution, while in other embodiments, the entity system 200 is operated by an entity other than a financial institution.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, an real-time resource capacity determination application 250, one or more entity applications 270, and a data repository 280 comprising user data 283 and entity device data 285, where the user data 283 comprises data associated with users 110 and/or one or more resource pools associated with the users 110 and the entity device data 285 comprises data associated with one or more entity devices. The one or more entity applications 270 may be any applications provided by the entity that allows users 110 to access information and/or perform one or more actions associated with one or more resource pools of the users 110. The computer-executable program code of the network server application 240, the real-time resource capacity determination application 250, the one or more entity application 270 to perform certain logic, data-extraction, and data-storing functions of the entity system 200 described herein, as well as communication functions of the entity system 200.

The network server application 240, the real-time resource capacity determination application 250, and the one or more entity applications 270 are configured to store data in the data repository 280 or to use the data stored in the data repository 280 when communicating through the network communication interface 210 with the electronic resource request processing system 300, and/or the computing device system 400 to perform one or more process steps described herein. In some embodiments, the entity system 200 may receive instructions from the electronic resource request processing system 300 via the real-time resource capacity determination application 250 to perform certain operations. The real-time resource capacity determination application 250 may be provided by the electronic resource request processing system 300.

Figure 3:
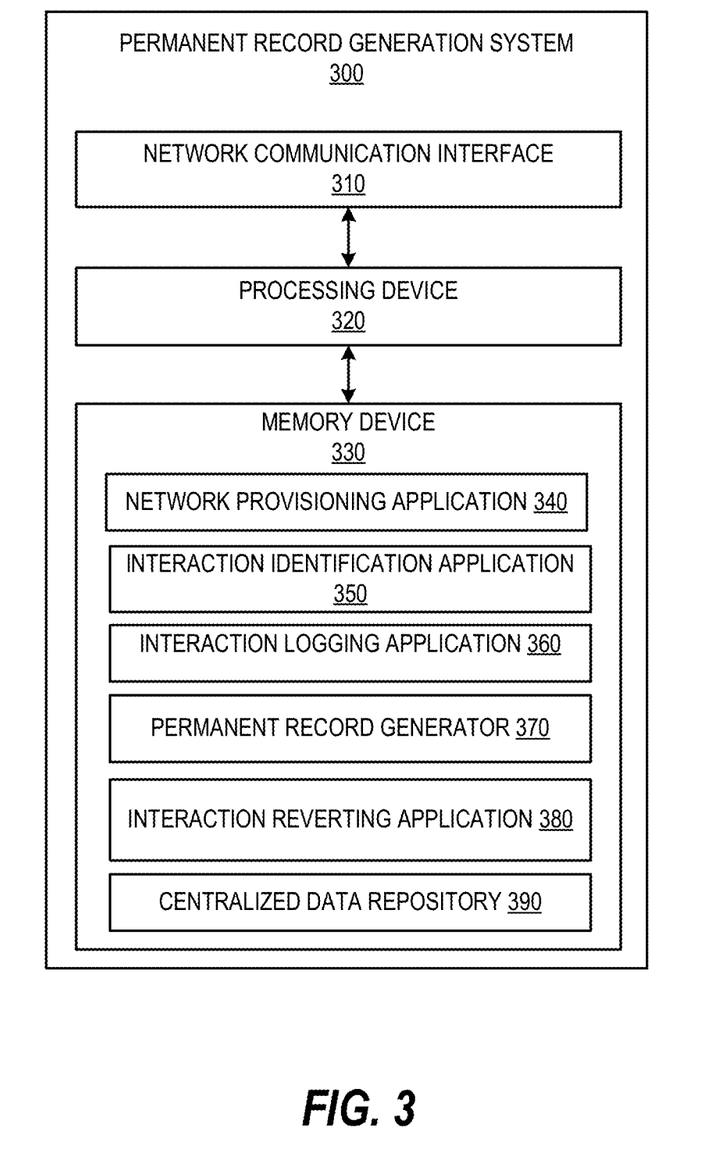
FIG. 3 provides a block diagram illustrating an electronic resource request processing system 300 of FIG. 1, in accordance with an embodiment of the invention.

FIG. 3 provides a block diagram illustrating the electronic resource request processing system 300 in greater detail, in accordance with embodiments of the invention. As illustrated in FIG. 3, in one embodiment of the invention, the electronic resource request processing system 300 includes one or more processing devices 320 operatively coupled to a network communication interface 310 and a memory device 330. In certain embodiments, the electronic resource request processing system 300 is operated by a first entity, such as a financial institution, while in other embodiments, the electronic resource request processing system 300 is operated by an entity other than a financial institution. In some embodiments, the electronic resource request processing system 300 is owned or operated by the entity of the entity system 200. In some embodiments, the electronic resource request processing system 300 may be an independent system. In alternate embodiments, the electronic resource request processing system 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the electronic resource request processing system 300 described herein. For example, in one embodiment of the electronic resource request processing system 300, the memory device 330 includes, but is not limited to, a network provisioning application 340, a real-time data extraction application 350, a predictive analysis application 360, an artificial intelligence application 370, a resource capacity determination application 380, and a centralized data repository 390 comprising data processed or accessed by one or more applications in the memory device 330. The computer-executable program code of the network provisioning application 340, the real-time data extraction application 350, the predictive analysis application 360, the artificial intelligence application 370, and the resource capacity determination application 380 may instruct the processing device 320 to perform certain logic, data-processing, and data-storing functions of the electronic resource request processing system 300 described herein, as well as communication functions of the electronic resource request processing system 300.

The network provisioning application 340, the real-time data extraction application 350, the predictive analysis application 360, the artificial intelligence application 370, and the resource capacity determination application 380 are configured to invoke or use the data in the data repository 390 when communicating through the network communication interface 310 with the entity system 200, and/or the computing device system 400. In some embodiments, the network provisioning application 340, the real-time data extraction application 350, the predictive analysis application 360, the artificial intelligence application 370, and the resource capacity determination application 380 may store the data extracted or received from the entity system 200, and the computing device system 400 in the centralized data repository 390. In some embodiments, the network provisioning application 340, the real-time data extraction application 350, the predictive analysis application 360, the artificial intelligence application 370, and the resource capacity determination application 380 may be a part of a single application. The functionalities of the network provisioning application 340, the real-time data extraction application 350, the predictive analysis application 360, the artificial intelligence application 370, and the resource capacity determination application 380 are explained in greater detail in FIG. 5.

Figure 4:
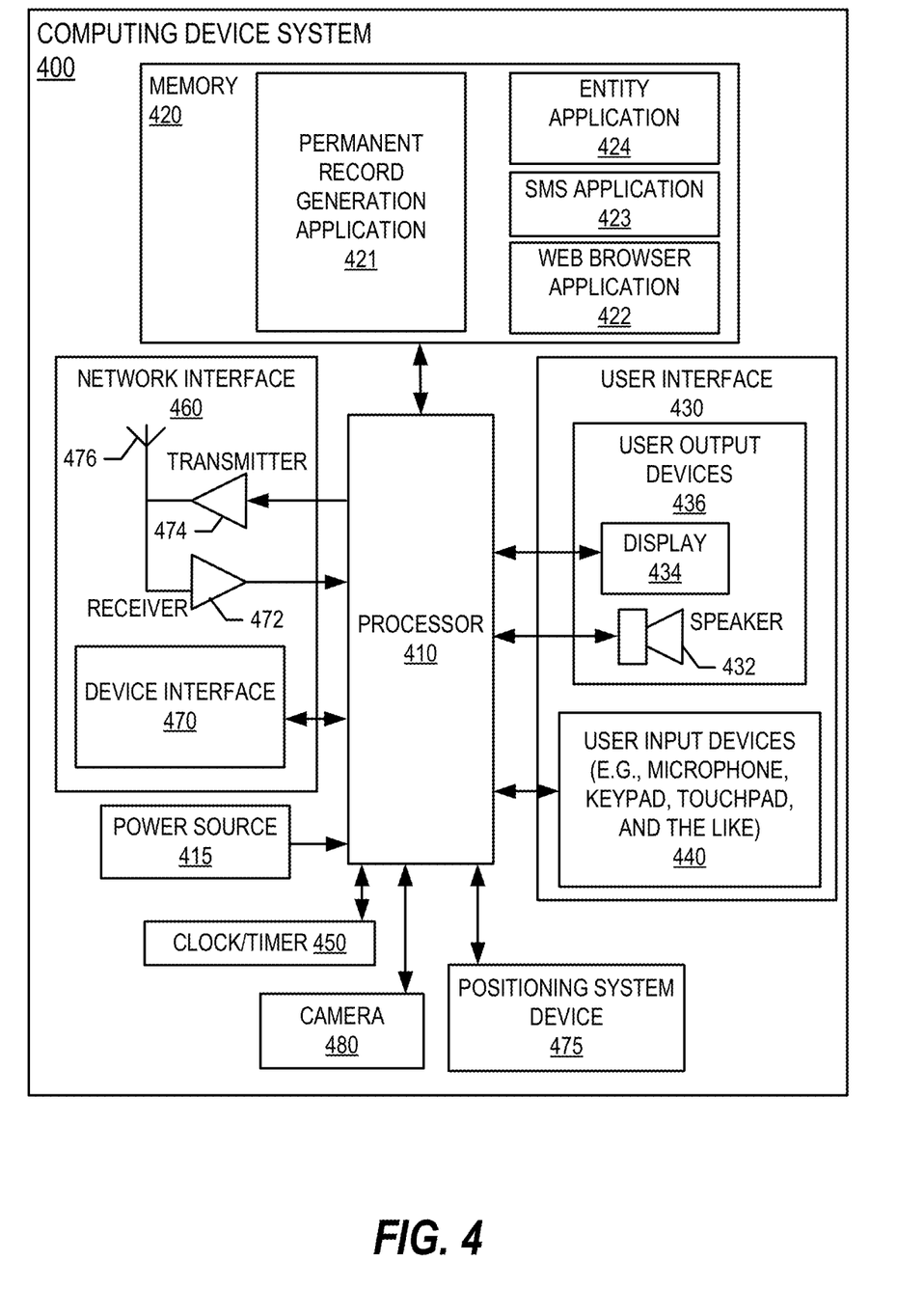
FIG. 4 provides a block diagram illustrating the computing device system 400 of FIG. 1, in accordance with an embodiment of the invention.

FIG. 4 provides a block diagram illustrating a computing device system 400 of FIG. 1 in more detail, in accordance with embodiments of the invention. However, it should be understood that a mobile telephone is merely illustrative of one type of computing device system 400 that may benefit from, employ, or otherwise be involved with embodiments of the present invention and, therefore, should not be taken to limit the scope of embodiments of the present invention. Other types of computing devices may include portable digital assistants (PDAs), pagers, mobile televisions, entertainment devices, desktop computers, workstations, laptop computers, cameras, video recorders, audio/video player, radio, GPS devices, wearable devices, Internet-of-things devices, augmented reality devices, virtual reality devices, automated teller machine devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a real-time resource capacity determination application 421, entity application 424, an SMS application 423, or the like. In some embodiments, the entity application 424 may be an online banking application. The real-time resource capacity determination application 421 may comprise instructions to a graphical user interface (GUI) on the display 430 that allows the user 110 to interact with the entity system 200, the electronic resource request processing system 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the real-time resource capacity determination application 421 provided by the electronic resource request processing system 300 allows the user 110 to access the electronic resource request processing system 300. In some embodiments, the entity application 424 provided by the entity system 200 and the real-time resource capacity determination application 421 allow the user 110 to access the functionalities provided by the electronic resource request processing system 300 and the entity system 200. In some embodiments, the entity application 424 may be an online banking application.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
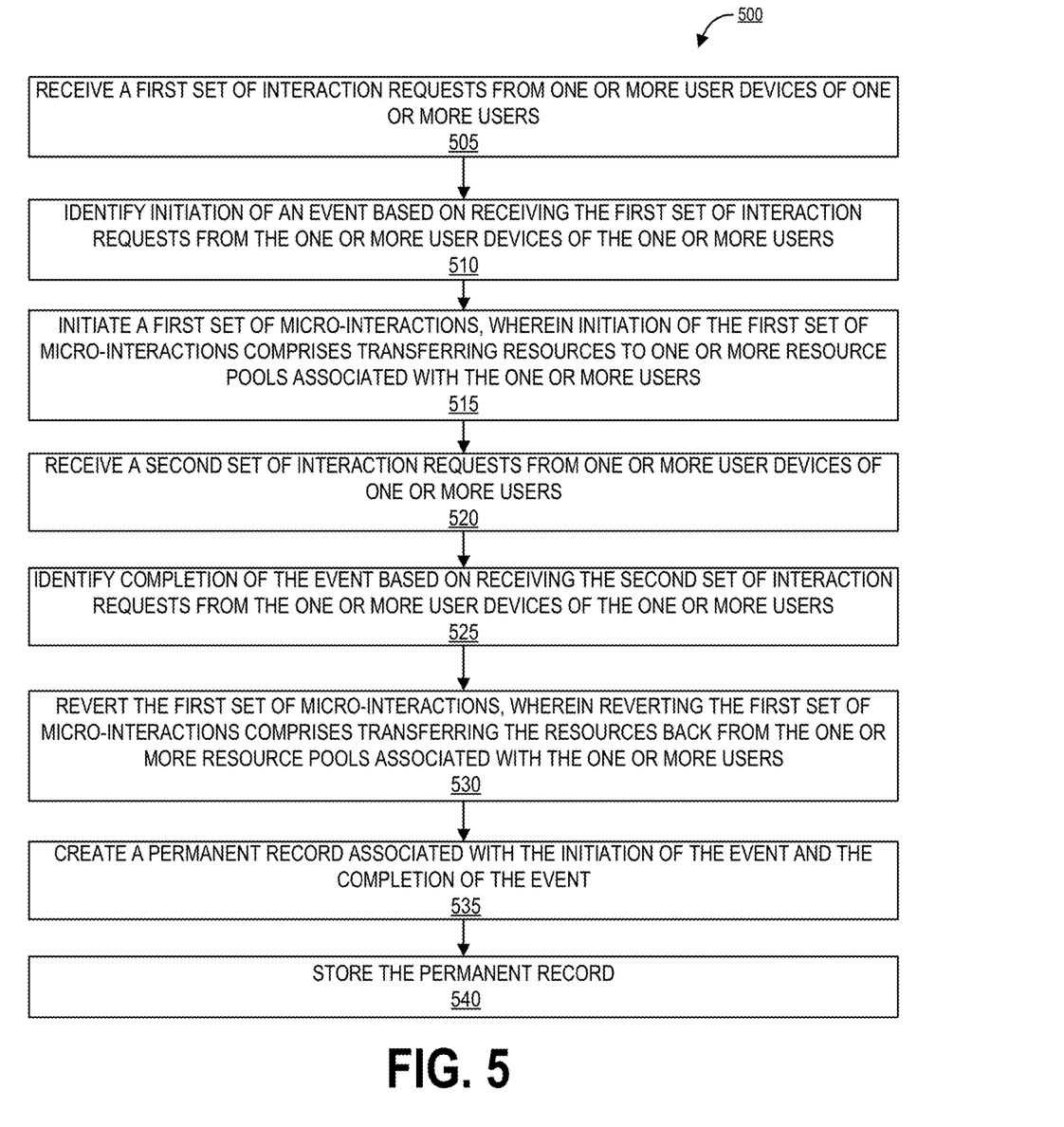
FIG. 5 provides a block diagram illustrating a process flow for establishing permanent records based on micro-interactions, in accordance with an embodiment of the invention.

FIG. 5 provides a block diagram illustrating a process flow 500 for establishing permanent records based on micro-interactions, in accordance with an embodiment of the invention.

As shown in block 505, the system receives a first set of interaction requests from one or more user devices of one or more users. In some embodiments, the system may receive the first set of interaction requests via an entity device provided by the entity associated with the entity system 200, where the entity device comprises an Near Field Communication (NFC) interface. In such embodiments, the first set of interaction requests may be NFC interaction requests. In some embodiments, the first set of interaction requests may be received via an entity application present on the one or more user devices (e.g., entity application 424), where the entity application provided by the entity associated with the entity system. In such embodiments, the first set of interaction requests are NFC requests that are initiated when the one or more user devices are within proximate distance, via NFC interfaces located on the one or more user devices. In some such embodiments, the first set of interaction requests are initiated automatically when the one or more user devices are within the proximate distance, where the one or more users associated with the one or more user devices have a previous interaction history. In some embodiments, the one or more users may perform the first set of the interaction requests via the one or more user devices directly by accessing the entity application (e.g., entity application 424) or an application provided by the system of the present invention (e.g., permanent record generation application 421) located on the one or more user devices.

As shown in block 510, the system identifies initiation of an event based on receiving the first set of interaction requests from the one or more user devices of the one or more users. The event may be an in-person event (e.g., in-person meeting). The first set of interaction requests may be initiated at different times by the users. For example, a first user of the one or more users may initiate a first interaction request of the first set of interaction requests at a first time-stamp, a second user of the one or more users may initiate a second interaction request of the first set of interaction requests at a second time-stamp, and a third user of the one or more users may initiate a third interaction request of the first set of interaction requests at a third time-stamp. In some embodiments, the system records the first set of time-stamps associated with the first set of interaction requests. In some embodiments, the system may determine initiation of the event after receiving a first interaction request of the first set of interaction requests. For example, the system may receive a first interaction request from a first user and may determine that the event has started. In some embodiments, the system may determine initiation of the event receiving at least two interaction requests of the first set of interaction requests. For example, the system may receive a first interaction request from a first user and a second interaction request from a second user and may determine that the event has started.

As shown in block 515, the system initiates a first set of micro-interactions, wherein initiation of the first set of micro-interactions comprises transferring resources to one or more resource pools associated with the one or more users. In some embodiments, the resources may be funds, digital currencies, or the like that have monetary value. The micro-interactions may be interactions that involve small amount of resources (e.g., one penny, 0.00001 digital currency, or the like). The one or more resource pools may be one or more accounts (e.g., checking account, savings account, digital currency accounts, or the like) associated with the one or more users. In some embodiments, the system may generate unique resources for the purposes of implementing this invention. In some embodiments, the system may perform the first set of micro-interactions via an entity application (e.g., online banking application, digital currency application) provided by the entity.

In some embodiments, the first set of micro-interactions may be interactions between adjacent users. For example, if three users have initiated the 3 interaction requests, the system may initiate a first micro-interaction from a first resource pool of a first user to a second resource pool of a second user, a second micro-interaction from the second resource pool of the second user to a third resource pool of a third user, and a third micro-interaction from the third resource pool of the third user to the first resource pool of the first user.

In some embodiments, the system may perform first micro-interaction with a first user of the one or more users and may perform the first set of micro-interactions excluding the first micro-interaction between a first resource pool of a first user and resource pools of the one or more users excluding the first user. For example, if three users have initiated the 3 interaction requests, the system may transfer 'X' amount to a first user from an entity resource pool of the entity and may transfer 'Y' amount from a first resource pool of the first user to a second resource pool of a second user and a third resource pool of a third user. In some embodiments, the system may use total value of resources involved with the first set of micro-interactions as a unique identifier associated with the event.

As shown in block 520, the system receives a second set of interaction requests from one or more user devices of one or more users. In some embodiments, the system may receive the second set of interaction requests via an entity device provided by the entity associated with the entity system 200, where the entity device comprises an Near Field Communication (NFC) interface. In such embodiments, the second set of interaction requests may be NFC interaction requests. In some embodiments, the second set of interaction requests may be received via the entity application present on the one or more user devices (e.g., entity application 424), where the entity application provided by the entity associated with the entity system. In such embodiments, the second set of interaction requests are NFC requests that are initiated when the one or more user devices are not within the proximate distance, via the NFC interfaces located on the one or more user devices. In some such embodiments, the second set of interaction requests are initiated automatically when the one or more user devices are not within the proximate distance. In some embodiments, the one or more users may perform the second set of the interaction requests via the one or more user devices directly by accessing the entity application (e.g., entity application 424) or an application provided by the system of the present invention (e.g., permanent record generation application 421) located on the one or more user devices.

As shown in block 525, the system identifies completion of the event based on receiving the second set of interaction requests from the one or more user devices of the one or more users. The second set of interaction requests may be initiated at different times by the users. For example, a first user of the one or more users may initiate a first interaction request of the second set of interaction requests at a first time-stamp, a second user of the one or more users may initiate a second interaction request of the second set of interaction requests at a second time-stamp, and a third user of the one or more users may initiate a third interaction request of the second set of interaction requests at a third time-stamp. In some embodiments, the system records the second set of time-stamps associated with the second set of interaction requests. In some embodiments, the system may determine completion of the event after receiving a last interaction request of the second set of interaction requests. For example, the system may receive a last interaction request from an $n^{th}$ user of 'n' users and may determine that the event has ended. In some embodiments, the system may determine last time-stamp associated with the last-interaction request as event completion time of the event.

As shown in block 530, the system reverts the first set of micro-interactions, wherein reverting the first set of micro-interactions comprises transferring the resources back from the one or more resource pools associated with the one or more users. For example, if 'X' amount was transferred to a first resource pool of a first user in block 515, the system reverts the interaction of 'X' amount.

As shown in block 535, the system creates a permanent record associated with the initiation of the event and the completion of the event. The system may insert the first set of time-stamps and a second set of time-stamps in the permanent record. In some embodiments, the system may also insert user identifiers, information associated with the first set of micro-interactions, location of the event, and any other information associated with the event in the permanent record. As shown in block 540, the system stores the permanent record. In some embodiments, the permanent record may be stored on a distributed register (e.g., blockchain). In some embodiments, if the resources transferred were digital resources, a record is automatically created on the distributed ledger and the system may leverage that record and create another record to store in a datastore.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, and the like), or an embodiment combining software and hardware aspects that may generally be referred to herein as a "system." Furthermore, embodiments of the present invention may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for establishing permanent records based on micro-interactions, the system comprising:
    a communication device;
    at least one processing device; and
    at least one non-transitory storage device with computer-readable program code stored thereon and accessible by the at least one processing device, wherein the computer-readable code when executed is configured to cause the at least one processing device to:
    identify initiation of an event based on receiving one or more first interaction requests from one or more user devices of one or more users;
    in response to receiving the one or more first interaction requests, initiate one or more micro-interactions, wherein initiation of the one or more micro-interactions comprises transferring resources to one or more resource pools associated with the one or more users;
    identify completion of the event;
    in response to identifying completion of the event, reverting the one or more micro-interactions, wherein reverting the micro-interactions comprises transferring the resources back from the one or more resource pools associated with the one or more users; and
    create a permanent record associated with the initiation of the event and the completion of the event.

2. The system according to claim 1, wherein the non-transitory computer-readable medium further comprises code configured to cause the at least one processing device to receive the one or more first interaction requests via an entity device comprising a Near Field Communication interface, wherein the one or more first interaction requests are Near Field Communication interaction requests.

3. The system according to claim 1, wherein the non-transitory computer-readable medium further comprises code configured to cause the at least one processing device to:
    determine one or more first time-stamps associated with the one or more first interaction requests; and
    insert the one or more first time-stamps in the permanent record, wherein the one or more first time-stamps are associated with initiation of the event.

4. The system according to claim 1, wherein identifying completion of the event is based on receiving one or more second interaction requests from the one or more user devices of the one or more users, and wherein the non-transitory computer-readable medium further comprises code configured to cause the at least one processing device to:
    determine one or more second time-stamps associated with the one or more second interaction requests; and
    insert the one or more second time-stamps in the permanent record, wherein the one or more second time-stamps are associated with completion of the event.

5. The system according to claim 4, wherein the non-transitory computer-readable medium further comprises code configured to cause the at least one processing device to:
    identify completion of the event based on receiving a last interaction request of the one or more second interaction requests;
    identify a last time-stamp associated with the last interaction request; and
    insert the last time-stamp as event completion time-stamp in the permanent record.

6. The system of claim 1, wherein the non-transitory computer-readable medium further comprises code configured to cause the at least one processing device to store the permanent record on a distributed ledger.

7. The system according to claim 1, wherein the non-transitory computer-readable medium further comprises code configured to cause the at least one processing device to transfer the resources and revert the resources, via an entity application provided by an entity.

8. A computer program product for establishing permanent records based on micro-interactions, the computer program product comprising at least one non-transitory computer readable medium having computer-readable program code portions embodied therein, the computer-readable program code portions comprising executable portions for:
    identifying initiation of an event based on receiving one or more first interaction requests from one or more user devices of one or more users;
    in response to receiving the one or more first interaction requests, initiating one or more micro-interactions, wherein initiation of the one or more micro-interactions comprises transferring resources to one or more resource pools associated with the one or more users;
    identifying completion of the event;
    in response to identifying completion of the event, reverting the one or more micro-interactions, wherein reverting the micro-interactions comprises transferring the resources back from the one or more resource pools associated with the one or more users; and
    creating a permanent record associated with the initiation of the event and the completion of the event.

9. The computer program product of claim 8, wherein the computer-readable program code portions comprising executable portions for receiving the one or more first interaction requests, via an entity device comprising a Near Field Communication interface, wherein the one or more first interaction requests are Near Field Communication interaction requests.

10. The computer program product of claim 8, wherein the computer-readable program code portions comprising executable portions for:
    determining one or more first time-stamps associated with the one or more first interaction requests; and
    inserting the one or more first time-stamps in the permanent record, wherein the one or more first time-stamps are associated with initiation of the event.

11. The computer program product of claim 8, wherein the computer-readable program code portions comprising executable portions for:
    determining one or more first time-stamps associated with the one or more first interaction requests; and
    inserting the one or more first time-stamps in the permanent record, wherein the one or more first time-stamps are associated with initiation of the event.

12. The computer program product of claim 11, wherein the computer-readable program code portions comprising executable portions for:
- identifying completion of the event based on receiving a last interaction request of one or more second interaction requests;
- identifying a last time-stamp associated with the last interaction request; and
- inserting the last time-stamp as event completion time-stamp in the permanent record.

13. The computer program product of claim 8, wherein the computer-readable program code portions comprising executable portions for storing the permanent record on a distributed ledger.

14. A computer-implemented method for establishing permanent records based on micro-interactions, the method comprising:
- identifying initiation of an event based on receiving one or more first interaction requests from one or more user devices of one or more users;
- in response to receiving the one or more first interaction requests, initiating one or more micro-interactions, wherein initiation of the one or more micro-interactions comprises transferring resources to one or more resource pools associated with the one or more users;
- identifying completion of the event;
- in response to identifying completion of the event, reverting the one or more micro-interactions, wherein reverting the micro-interactions comprises transferring the resources back from the one or more resource pools associated with the one or more users; and creating a permanent record associated with the initiation of the event and the completion of the event.

15. The computer-implemented method of claim 14, wherein the method further comprises receiving the one or more first interaction requests, via an entity device comprising a Near Field Communication interface, wherein the one or more first interaction requests are Near Field Communication interaction requests.

16. The computer-implemented method of claim 14, wherein the method further comprises:
- determining one or more first time-stamps associated with the one or more first interaction requests; and
- inserting the one or more first time-stamps in the permanent record, wherein the one or more first time-stamps are associated with initiation of the event.

17. The computer-implemented method of claim 14, wherein the method further comprises:
- determining one or more first time-stamps associated with the one or more first interaction requests; and
- inserting the one or more first time-stamps in the permanent record, wherein the one or more first time-stamps are associated with initiation of the event.

18. The computer-implemented method of claim 17, wherein the method further comprises:
- identifying completion of the event based on receiving a last interaction request of one or more second interaction requests;
- identifying a last time-stamp associated with the last interaction request; and
- inserting the last time-stamp as event completion time-stamp in the permanent record.

19. The computer-implemented method of claim 18, wherein the method further comprises storing the permanent record on a distributed ledger.

20. The computer-implemented method of claim 14, wherein the method further comprises transferring the resources and revert the resources, via an entity application provided by an entity.

* * * * *